(12) United States Patent
Davis

(10) Patent No.: US 6,956,859 B2
(45) Date of Patent: Oct. 18, 2005

(54) SWITCHING DEVICES

(75) Inventor: Simon Paul Davis, Romsey (GB)

(73) Assignee: Roke Manor Research Limited, Romsey (GB)

( * ) Notice: Subject to any disclaimer, the term of this patent is extended or adjusted under 35 U.S.C. 154(b) by 773 days.

(21) Appl. No.: 09/915,553

(22) Filed: Jul. 27, 2001

(65) Prior Publication Data

US 2002/0018469 A1 Feb. 14, 2002

(30) Foreign Application Priority Data

Jul. 27, 2000 (GB) .............................................. 0018328
Oct. 6, 2000 (GB) .............................................. 0024468

(51) Int. Cl.⁷ .............................................. H04L 12/56
(52) U.S. Cl. .................................... 370/397; 370/413
(58) Field of Search ................................ 370/229–235, 370/389, 395.4–395.71, 397–399, 412–419

(56) References Cited

U.S. PATENT DOCUMENTS

| | | | |
|---|---|---|---|
| 5,790,770 A | | 8/1998 | Caldara et al. |
| 6,044,061 A | * | 3/2000 | Aybay et al. ............... 370/230 |
| 6,442,172 B1 | * | 8/2002 | Wallner et al. ............. 370/416 |
| 6,542,507 B1 | * | 4/2003 | Khacherian et al. ... 370/395.43 |
| 6,625,160 B1 | * | 9/2003 | Suzuki ....................... 370/413 |
| 6,628,609 B2 | * | 9/2003 | Chapman et al. ........... 370/229 |
| 6,654,343 B1 | * | 11/2003 | Brandis et al. ............. 370/229 |
| 6,700,894 B1 | * | 3/2004 | Shung ........................ 370/412 |
| 6,707,824 B1 | * | 3/2004 | Achilles et al. ............. 370/412 |
| 6,747,971 B1 | * | 6/2004 | Hughes et al. .............. 370/387 |
| 6,757,246 B2 | * | 6/2004 | Alasti et al. ................ 370/230 |

FOREIGN PATENT DOCUMENTS

| | | |
|---|---|---|
| EP | 0678996 | 10/1995 |
| EP | 0680180 | 11/1995 |
| GB | 2318250 | 4/1998 |
| WO | 9900949 | 1/1999 |

OTHER PUBLICATIONS

European Search Report Dated May 8, 2003.

* cited by examiner

*Primary Examiner*—Zarni Maung
*Assistant Examiner*—Van Nguyen
(74) *Attorney, Agent, or Firm*—Crowell & Moring LLP

(57) ABSTRACT

Described herein is a method for making bandwidth allocation for data to be sent from a plurality of ingress forwarders or LICs (310, 312, 314, 316) egress forwarders or LICs (320, 322, 324, 326) across a routing device (330). The data may be unicast and/or multicast. The bandwidth allocation is calculated in accordance with ingress forwarder multicast queue occupancy for each ingress forwarder (312, 314, 316), the number of multicast cells received by egress forwarders (322, 324, 326) from the ingress forwarders in the last bandwidth allocation period, and the bandwidth allocated to non-real time multicast flows from ingress forwarders (310, 312, 314, 316) to egress forwarders (320, 322, 324, 326).

1 Claim, 3 Drawing Sheets

SWITCHING DEVICES

BACKGROUND OF THE INVENTION

The present invention relates to improvements in or relating to switching devices, and is more particularly concerned with a method of adjusting bandwidth in such devices.

Traffic volume in the Internet is growing exponentially, doubling every three to six months. The current capacity of Internet Protocol (IP) routers is insufficient to meet this demand and hence products that can route IP traffic at extremely large aggregate bandwidths of the order of 10 Gbit/s to several Tbit/s. Such routers are termed "Super Routers".

Additionally, there is a growing need to support multicast (one to many or many to many) communications within the internet or any other IP based network. To support such a service, an IP router must be able to replicate packets and send them to multiple outputs on a per packet basis. In a router where bandwidth allocations are strictly controlled (in order to support Quality of Service criteria), it is necessary to determine how much bandwidth to allocate to multicast traffic across the core switching fabric.

SUMMARY OF THE INVENTION

It is therefore an object of the present invention to provide a method which overcomes the problems mentioned above.

In accordance with one aspect of the present invention, there is provided a method of allocating bandwidth for multicast traffic in a switching device connected between a plurality of ingress means and a plurality of egress means, the method comprising the steps of:

a) determining ingress multicast queue occupancy for each ingress means;

b) determining the number of multicast cells received by the egress means from the ingress means in the last bandwidth allocation period;

c) determining the bandwidth at each ingress means and egress means after real time bandwidth allocations have been taken into account; and d) calculating the bandwidth allocation for the next bandwidth allocation period in accordance with the values determined in steps a), b) and c).

Other objects, advantages and novel features of the present invention will become apparent from the following detailed description of the invention when considered in conjunction with the accompanying drawings.

DETAILED DESCRIPTION OF THE INVENTION

The present invention relates to a method of dynamically adjusting the bandwidth, allocated to multicast traffic, across an asynchronous transfer mode (ATM) switch or crossbar like switching fabric that joins several IP packet forwarder functions to form a "Super Router" node.

In order to prevent head of line blocking, unicast traffic is queued in separate logical scheduling entities (called scheduler blocks) according to which egress forwarder it is destined. The scheduler block serves a set of queues (per class or per connection) via any mechanism desired (e.g. strict priority or Weighted Fair Queuing) provided that the real time IP traffic class is guaranteed a minimum bandwidth. However, for multicast traffic, it is not practical to queue traffic on the basis of a unique combination of egress destinations. This is because the number of queues required becomes unmanageable even for a relatively small number of egress ports. Hence, a separate multicast scheduler block is used in each ingress forwarder containing one real time multicast queue and one or more non-real time multicast queues as shown in FIG. 1.

Figure 1:
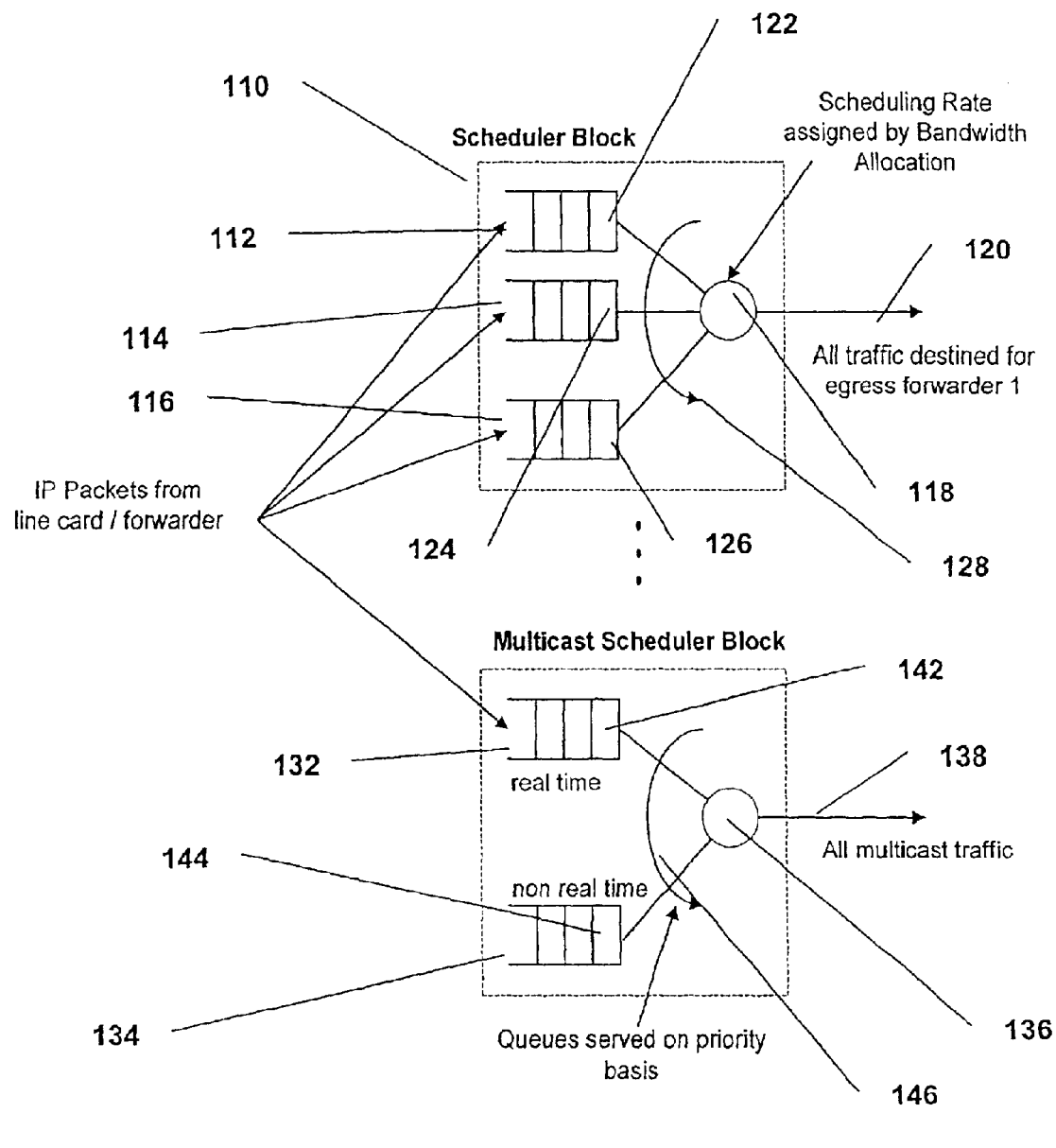
FIG. 1 illustrates an ingress forwarder scheduling function.

FIG. 1 shows an ingress forwarder 100 which includes a unicast scheduler block 110 for scheduling unicast traffic and a multicast scheduler block 130 for scheduling multicast traffic. Although only one unicast scheduler block 110 and one multicast scheduler block 130 are shown, it will be appreciated that any number of such scheduler blocks may be provided in any combination according to a particular application.

The unicast scheduler block 110 comprises a plurality of queues 112, 114, 116 connected to a scheduler 118 which has an output 120 connected to a particular egress forwarder (not shown), for example, egress forwarder 1 as indicated. Although only three queues 112, 114, 116 are shown, it will readily be understood that any number of queues may be provided in accordance with a particular application.

The scheduler 118 has a scheduling rate which is determined by unicast bandwidth allocation and operates to transmit cells 122, 124, 126 at the head of respective queues 112, 114, 116 according to their priority, as indicated by arrow 128, to the output 120. Unicast bandwidth allocation is described in co-pending British patent application no. 9907313.2 (docket number F21558/98P4863), incorporated herein by reference.

The multicast scheduler block 130 comprises queues 132, 134—a real time queue 132 and a non-real time queue 134. Both queues 132, 134 are connected to a scheduler 136 through which all multicast traffic passes. The scheduler 136 has an output 138.

It will readily be appreciated that although only one real time queue and one non-real time queue are shown, there may any number of such queues depending on the particular application.

Cells 142, 144 at the head of respective ones of the queues 132, 134 are selected for passage through the scheduler 136 to output 138 in accordance with a priority basis as indicated by arrow 146.

Incoming IP traffic from the line is queued in the relevant queues associated with a scheduler block. The choice of scheduler block is governed by the destination egress forwarder and whether it is multicast or unicast traffic. The class of service determines the specific queue to be utilized.

Figure 2:
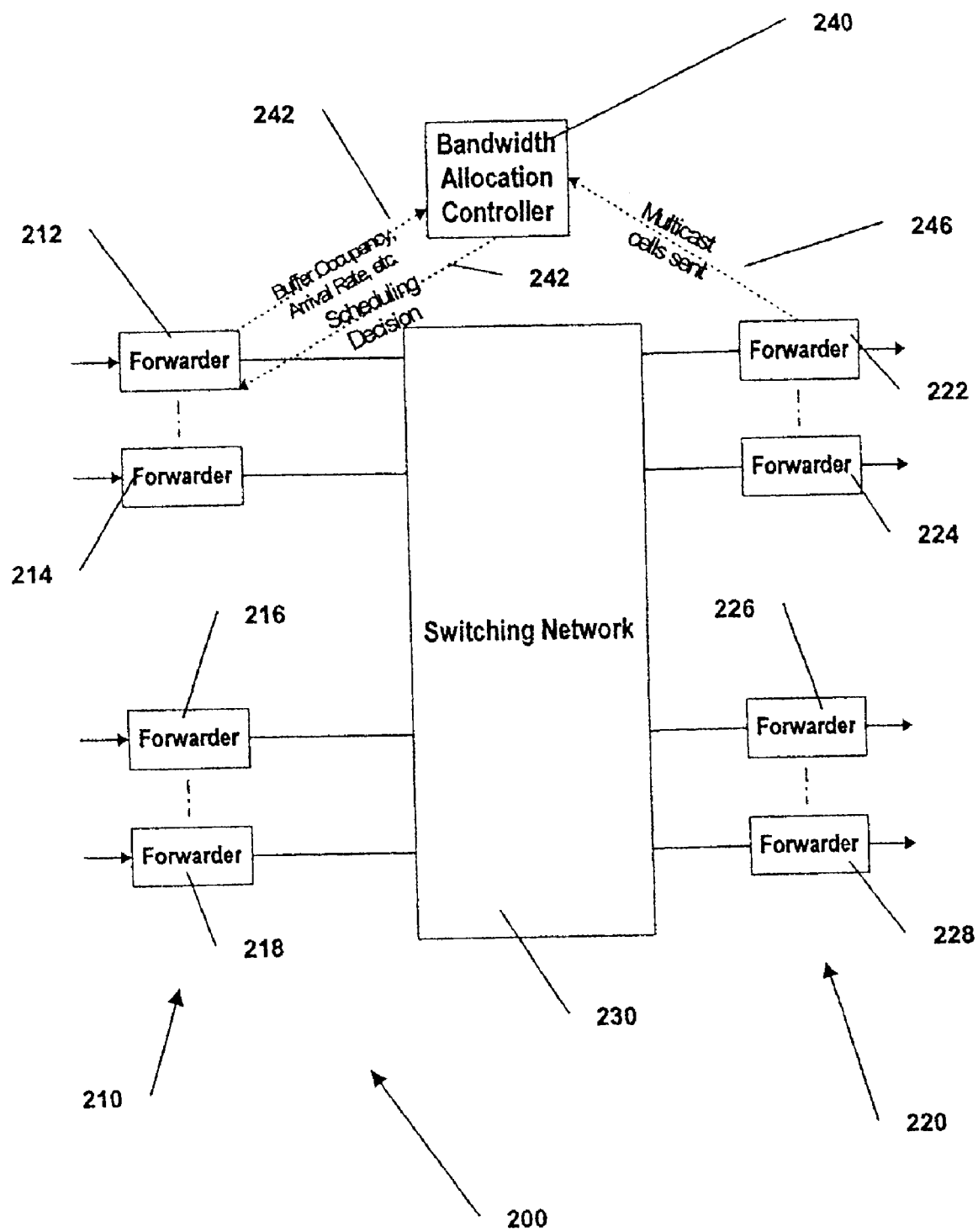
FIG. 2 illustrates centralized bandwidth allocation in accordance with the present invention.

The overall view of a centralized bandwidth allocation arrangement 200 is shown in FIG. 2. The arrangement 200 comprises a plurality of ingress forwarders 210, a plurality of egress forwarders 220, a switching network 230 and a bandwidth allocation controller 240. Each ingress forwarder 212, 214, 216, 218 can be connected to one or more egress forwarders 222, 224, 226, 228 as required via the switching network 230 under the control of the bandwidth allocation controller 240.

Although only four ingress forwarders 212, 214, 216, 218 and four egress forwarders 222, 224, 226, 228 are shown, it will be appreciated that any number of ingress and egress forwarders can be provided in accordance with a particular application.

As shown in FIG. 2, each ingress forwarder 212, 214, 216, 218 interfaces with the bandwidth allocation controller 240 via links 242 and 244—only the links 242, 244 to ingress forwarder 212 being shown for clarity. Link 242 provides the bandwidth allocation controller 240 with information relating to buffer occupancy, arrival rate of packets of cells etc for each ingress forwarder 212, 214, 216, 218. Link 244 provides each ingress forwarder 212, 214, 216, 218 with scheduling decisions made by the bandwidth allocation controller 240.

Similarly, each egress forwarder 222, 224, 226, 228 interfaces with the bandwidth allocation controller 240 via link 246 which provides the bandwidth allocation controller 240 with information relating to the multicast cells sent. Again, only the link 246 with egress forwarder 222 is shown for clarity.

For every fixed period, that is, the Bandwidth Allocation Period (BAP), each ingress forwarder 212, 214, 216, 218 sends buffer occupancy (and possibly other information) via link 242 to the central bandwidth allocation controller 240. In addition, each egress forwarder 222, 224, 226, 228 sends information via link 246 on how many multicast cells were received in the last BAP from each ingress forwarder 212, 214, 216, 218. The bandwidth allocation controller 240 works out the allocation of bandwidth between all ingress/egress forwarder pairs for the next BAP and uses this to provide scheduling information to the ingress forwarders 212, 214, 216, 218 via link 244 telling them which cells/packets to transmit in the next cell period.

However, in order to include multicast functionality into the bandwidth allocation process some additions are required to the unicast algorithm defined in British patent application no. 9907313.2 mentioned above. The unicast bandwidth allocation algorithm essentially divides the available bandwidth at ingress and egress amongst competing forwarders using the ingress queue length as a weighting factor. The queue length of the unicast scheduler block for traffic on ingress forwarder i destined for egress forwarder j is denoted by $q_{ij}$. Thus, for example, the amount of bandwidth allocated to unicast traffic from ingress forwarder i to egress forwarder j at the egress, $be_{ij}$, is given by the following equation:—

$$be_{ij} = ABWE_j * \frac{q_{ij}}{\sum_k q_{ik}} \quad (1)$$

Here, $ABWE_j$ is the available bandwidth after real time reservations have been accounted for at the egress forwarder j, and $_{13}q_{ik}$ is the sum of the buffer occupancies for data destined for egress forwarder j in ever ingress forwarder. The term $q_{ik}$ represents the buffer occupancy of the scheduler block in ingress forwarder i destined for egress forwarder j.

For real time multicast flows, the fan-out and bandwidth guarantees are known in advance and the sum of all ingress and egress requirements can be subtracted from the available bandwidth in the same way as for real time unicast traffic flows.

As the amount of egress bandwidth required for non-real time multicast flows is not known (compared with the case for real time multicast), it must be determined by the system. One way of determining the amount of egress bandwidth required is to collect statistics at the egress forwarders on the number of multicast cells received from each ingress forwarder in the last BAP. These statistics can then be included in the queue statistics message sent from the ingress forwarder to the central scheduler every BAP.

Although FIGS. 1 and 2 have been described with reference to ingress and egress forwarders, it will be appreciated that the ingress and egress devices are not limited to such devices and may comprise any suitable device which enables packets of data to be transferred from one side of a switching network to another.

Figure 3:
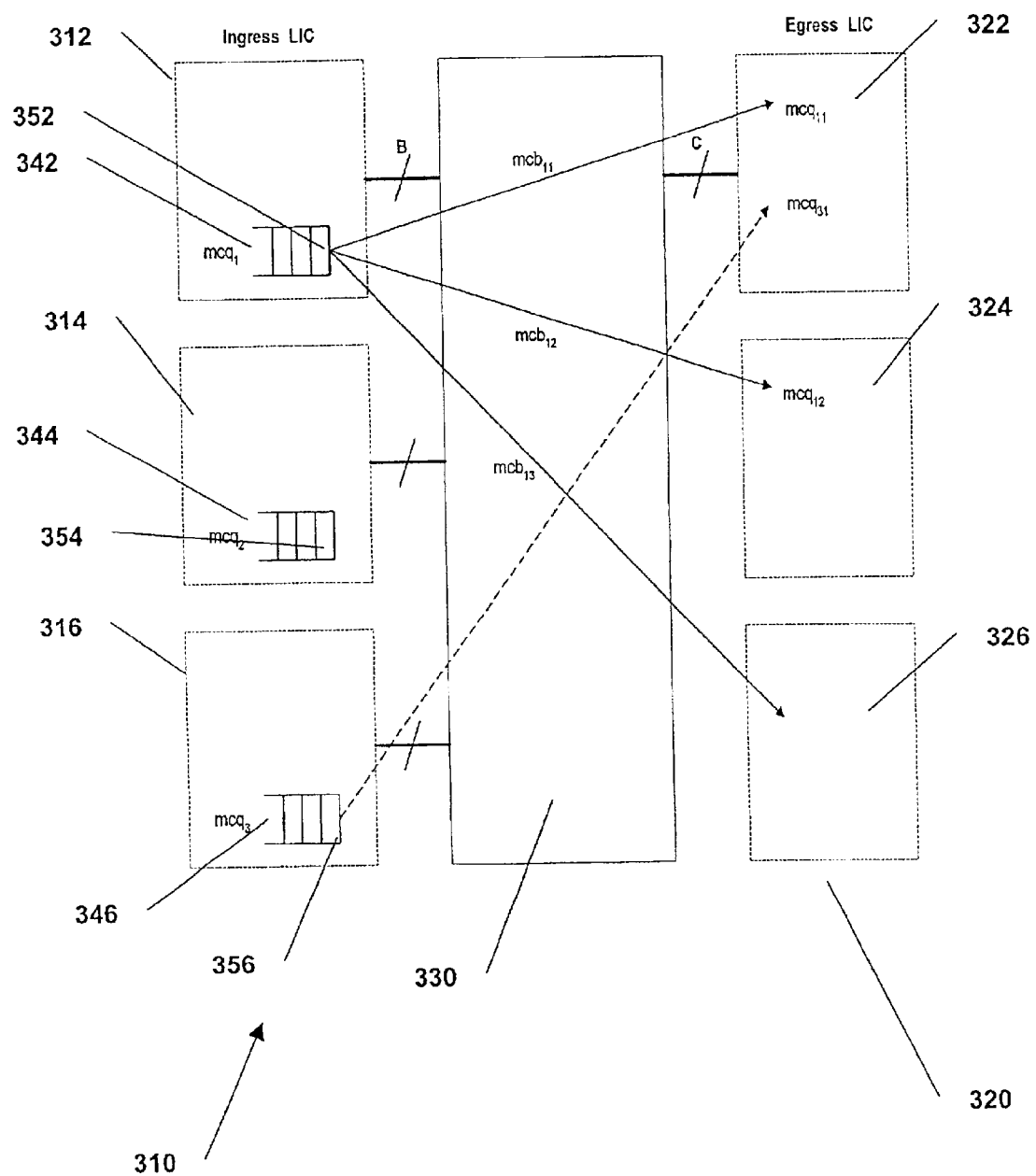
FIG. 3 illustrates effective queue lengths for non-real time multicast bandwidth allocation.

FIG. 3 illustrates a system 300 for calculating non-real time multicast bandwidth allocation. The system 300 comprises a plurality of ingress forwarders or line interface cards (LICs) 310, a plurality of egress forwarders or line interface cards (LICs) 320, and a switching network 330. Each ingress LIC 312, 314, 316 has at least one queue 342, 344, 346 as shown. Each egress LIC 322, 324, 326 receives data from one or more ingress LICs 312, 314, 316 across the switching network 330 as shown. Only one queue 342, 344, 346 is shown in each ingress LIC 312, 314, 316 for clarity.

The ingress forwarder multicast queue occupancy is denoted as $mcq_i$ for ingress forwarder i. The number of multicast cells received by egress forwarder j from ingress forwarder i in the last BAP is denoted by $mcq_{ij}$. The bandwidth allocated to non-real time multicast flows from ingress forwarder i to egress forwarder j is denoted by $mcb_{ij}$.

The value of $mcq_i$ is used in the ingress bandwidth fair share in the same manner as $q_{ij}$ does in the unicast centralised bandwidth allocation algorithm.

The values $mcq_{ij}$ take part in the egress fair share allocation by providing a proportion with which to scale the ingress multicast queue occupancies. This means that the effective weight that the occupancy of the ingress non-real time (nrt) multicast queue ($mcq_i$) has on an egress forwarder j (called $emcq_{ij}$) is determined by the proportion of nrt cells received by egress forwarder j compared to all those received at egress forwarder j in the last BAP period. It is therefore governed by the following equation:—

$$emcq_{ij} = cq_i * \frac{mcq_{ij}}{\sum_k mcq_{ij}} \quad (2)$$

The value of $emcq_{ij}$ will be used in egress bandwidth allocation functions alongside the unicast equivalents $q_{ij}$.

Thus, the equivalent of equation (1) when including the multicast traffic is given in equation (3):—

$$bme_{ij} = ABWE_j * \frac{emcq_{ij}}{\sum_k q_{ku} + \sum_k emcq_{kj}} \quad (3)$$

where $bme_{ij}$ is the nrt multicast bandwidth allocated between ingress forwarder i and egress forwarder j, $ABWE_j$, $emcq_{ij}$ and $q_{ik}$ are the same as before.

Similar principles can be applied at the ingress for bandwidth allocation and any left over bandwidth can be distributed between unicast and multicast allocations by any fair mechanism required.

The ingress equation for nrt multicast bandwidth becomes:—

$$bmi_{ij} = ABWI_i * \frac{imcq_{ij}}{\sum_k q_{jk} + \sum_k imcq_{jk}} \quad (4)$$

$ABWI_j$ is the available bandwidth at the ingress forwarder i after real time traffic reservations have been taken into account. The term $imcq_{ij}$ is the ingress equivalent of $emcq_{ij}$ and is the effective weight with which to scale the ingress multicast queue occupancy. It is calculated from equation (5).

$$imcq_{ij} = mcq_i * \frac{mcq_{ij}}{\sum_k mcq_{ik}} \quad (5)$$

The actual allocated multicast bandwidth between ingress forwarder i and egress forwarder j is the minimum of the ingress and egress bandwidth allocations as defined in equation (6).

$$bm_{ij} = {}^{min}(bmi_{ij}, bme_{ij}) \quad (6)$$

Any remaining bandwidth not allocated after this process has been carried out can be distributed between unicast and multicast allocations in any fair manner desired.

The advantages of the scheme described above include:

A 100% efficient distribution of bandwidth

A fair distribution of nrt bandwidth according to ingress queue occupancies

Prevention of overload of the cross-bar by restricting the total amount of bandwidth allocated at ingress and egress ports to the cross-bar.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of allocating bandwidth for multicast traffic in a switching device connected between a plurality of ingress means and a plurality of egress means, the method comprising the steps of:

a) determining ingress multicast queue occupancy for each ingress means;

b) determining the number of multicast cells received by the egress means from the ingress means in the last bandwidth allocation period;

c) determining the bandwidth at each ingress means and egress means; and d) calculating the bandwidth allocation for the next bandwidth allocation period in accordance with the values determined in steps a), b) and c).

* * * * *